(12) United States Patent
Nagano et al.

(10) Patent No.: US 6,609,746 B1
(45) Date of Patent: Aug. 26, 2003

(54) AIR CONDITIONING UNIT FOR CAR

(75) Inventors: Hideki Nagano, Saitama (JP); Koji Fukushima, Saitama (JP); Kazuhiro Irie, Saitama (JP)

(73) Assignee: Zexel Valeo Climate Control Corporation, Osato-gun (JP)

( * ) Notice: Subject to any disclaimer, the term of this patent is extended or adjusted under 35 U.S.C. 154(b) by 0 days.

(21) Appl. No.: 10/009,711

(22) PCT Filed: Apr. 17, 2000

(86) PCT No.: PCT/JP00/02482

§ 371 (c)(1),
(2), (4) Date: Feb. 12, 2002

(87) PCT Pub. No.: WO00/74962

PCT Pub. Date: Dec. 14, 2000

(30) Foreign Application Priority Data

Jan. 17, 2000 (JP) ........................................ 2000-008194

(51) Int. Cl.[7] .............................................. B62D 25/14
(52) U.S. Cl. ........................................... 296/70; 180/90
(58) Field of Search ............................ 296/70, 72, 208; 180/90

(56) References Cited

FOREIGN PATENT DOCUMENTS

JP          10-006870 A          1/1998

*Primary Examiner*—Joseph D. Pape
(74) *Attorney, Agent, or Firm*—Frishauf, Holtz, Goodman & Chick, P.C.

(57) ABSTRACT

In an air conditioning unit for an automotive vehicle, which is housed in a space defined by a vehicle panel 7 separating an engine room and a vehicle compartment from each other, an Instrument panel 5 arranged in the vehicle compartment, and a floor panel 6 arranged on a floor of the vehicle compartment, bracket portions 20 for supporting an audio unit 40 are integrally formed with a rear portion of a unit casing 10 in a front-rear direction of the vehicle, the unit casing 10 being located in a central portion of the vehicle in a left-right direction thereof. The bracket portions 20 have upper end fixing plates 31 thereof fixed to the Instrument panel 5 and lower end fixing plates 33 thereof fixed to the floor panel 6, by bolts or pins. Further, casing fixing plates 36 are fixed to a bracket 51 of a steering member 50 by bolts.

2 Claims, 9 Drawing Sheets

AIR CONDITIONING UNIT FOR CAR

This application is a U.S. National Phase Application under 35 USC 371 of International Application PCT/JP00/02482 (not published in English) filed Apr. 17, 2000.

TECHNICAL FIELD

This invention relates to an air conditioning unit for automotive vehicles.

BACKGROUND ART

FIG. 8 is a front view of an instrument panel, and FIG. 9 is a cross-sectional view of the instrument panel taken on line IX—IX of FIG. 8 as viewed from an arrow therein.

The instrument panel 305 through which extends a steering wheel 311 has two openings 305A, 305B formed at a central portion thereof in the left-right direction of a vehicle.

A vent outlet grill 340 is fitted in one 305B of the openings.

An audio unit 340 having an air conditioning unit-operating block is fitted in the other 305A of the same.

A space defined by the instrument panel 305, a floor panel 306 and a vehicle panel 307 houses an air conditioning unit 301.

The air conditioning unit 301 is comprised of a blower unit 308, a cooler unit 309, and a heater unit 310.

Air is taken in by driving a blower motor, not shown, of the blower unit 308 and then blown out via outlet ports (including the vent outlet grill 304) formed at locations downstream of the blower unit 308.

The cooler unit 309 includes an evaporator 309A and absorbs heat from air passing through the evaporator 309A.

The heater unit 310 heats the air having passed through the evaporator 309.

The audio unit 340 is mounted in the vehicle via guides 335 of brackets 320. The brackets 320 have upper ends thereof mounted to the instrument panel 305 and lower ends thereof mounted to the floor panel 306.

The heater unit 110 is mounted to the vehicle panel 307.

In recent years, integration of vehicle components into modules, i.e. so-called modularization of vehicle components, has come to be carried out.

This technique of modularization of vehicle components contributes not only to improvement in mountability but also to reduction of the number of components and man-hours required for assembly of a vehicle and to resultant reduction of manufacturing costs, and hence draws attention in the field of vehicle manufacturing.

Modularization is advantageous particularly to the audio unit 340 and the heater unit to be housed in a small space defined by the instrument panel 305, the floor panel 306, and the vehicle panel 307.

From the viewpoint of this modularization, the above prior art cannot achieve sufficient reduction of the number of components and that of assembly steps.

As a solution to this problem, Japanese Laid-Open Patent Publication Kokai No. 10-6870 discloses a technique of integrally forming a casing for housing an audio unit with a unit casing, thereby reducing the number of components; and that of assembly steps.

However, in this technique, since the unit casing is configured such as it also serves as a casing for the audio unit, if the unit casing is assembled with an instrument panel in a misaligned or improperly positioned manner, the audio unit which is assembled with the unit casing after assembling the air conditioning unit with the instrument panel is also improperly positioned with respect to the instrument panel.

If the center of the opening formed in the instrument panel does not agree with the center of a switch panel of the audio unit, it is impossible to ensure a uniform clearance between the audio unit and the opening, which degrades the appearances of the air conditioning unit and the instrument panel.

DISCLOSURE OF INVENTION

It is an object of the invention to provide an air conditioning unit for an automotive vehicle, which can be assembled with an instrument panel with high accuracy.

To attain the above object, the present invention provides an air conditioning unit for an automotive vehicle, which is housed in a space defined by a vehicle panel separating an engine room and a vehicle compartment from each other, an instrument panel arranged in the vehicle compartment, and a floor panel arranged on a floor of the vehicle compartment, which comprises a unit casing for being located In a central portion in a left-right direction of the vehicle, a bracket portion integrally formed with a rear portion of the unit casing in a front-rear direction of the vehicle, for supporting electrical equipment, a fixing portion for fixedly securing the unit casing to at least one of the instrument panel, a steering member and the floor panel, and error-accommodating means for accommodating an assembly error in assembling of the electrical equipment and the instrument panel.

Even if electrical equipment is assembled with an instrument panel in a misaligned or improperly-positioned manner, it is possible to accommodate the misalignment or displacement between the electrical equipment and the instrument panel by the error-accommodating means, so that the electrical equipment can be assembled with the instrument panel with higher accuracy.

Preferably, the fixing portion comprises a fixing member for fixedly securing the unit casing to any of the instrument panel, the steering member, and the floor panel, and an engaging member for engagement with any of the instrument panel, the steering member, and the floor panel.

According to this preferred embodiment, it is possible to fix the unit casing e.g. to the steering member by the fixing member and engage the same with the Instrument panel and the floor panel by the engaging members, thereby simplifying the operation for securing the unit casing to the vehicle and reducing man-hours required for assembly.

Preferably, the bracket portion has a guide integrally formed therewith for guiding the electrical equipment to a predetermined position during assembly of the electrical equipment with the instrument panel.

According to this preferred embodiment, it is possible to guide even a heavy electrical equipment increased in size to the predetermined position by the guide, thereby facilitating an operation for assembling the electrical equipment with the instrument panel.

Preferably, the electrical equipment is integrally assembled with the unit casing.

According to this preferred embodiment, during assembly of the air conditioning unit with the vehicle, it is possible to assemble the electrical equipment with the instrument panel together with the unit casing by assembling the unit casing with the vehicle, which contributes to reduction of a time period for assembling the air conditioning unit with the vehicle.

Preferably, the electrical equipment includes a cable for air conditioning, one end of the cable being positioned on a compartment side of the electrical equipment with respect to a fixing plate of the electrical equipment for fixing the electrical equipment to the bracket portion, and another end of the cable which extends from the electrical equipment to the unit casing by passing outside the bracket portion, being fixedly connected to door-driving means for driving a door arranged in the unit casing.

According to this preferred embodiment, since the cable for air conditioning is fixedly connected to door-driving means, when the air-conditioning unit Is assembled with the vehicle, an operation for fixing the cable from the electrical equipment to a door-driving lever can be dispensed with, which makes It possible to reduce time for assembling the air conditioning unit with the vehicle as well as to manufacture the air conditioning unit at lower costs.

BEST MODE OF CARRYING OUT THE INVENTION

The invention will now be described in detail with reference to drawings showing preferred embodiments thereof.

Figure 1:
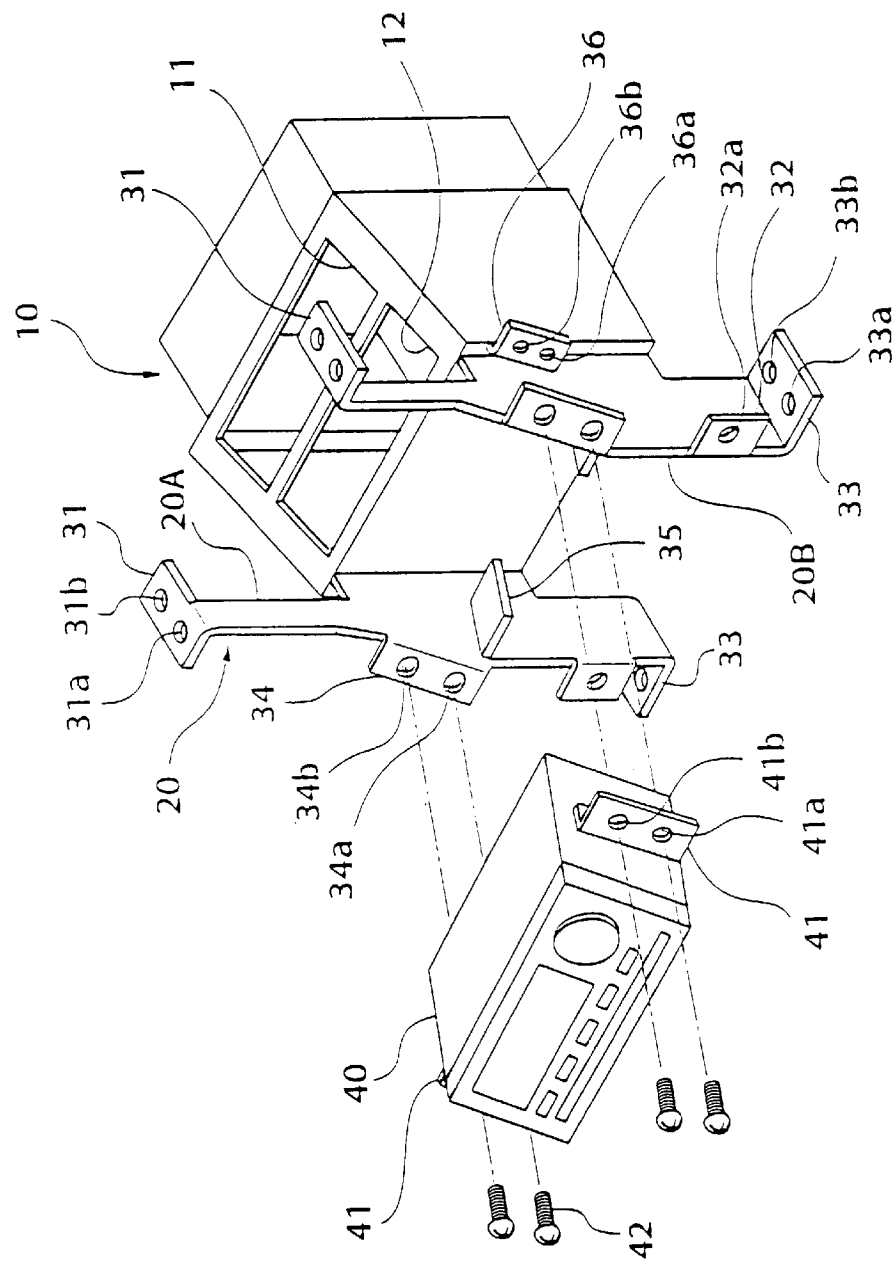
FIG. 1 is an exploded perspective view showing the relationship between a unit casing of an air conditioning unit for an automotive vehicle, according to a first embodiment of the Invention, and electrical equipment.

FIG. 1 is an exploded perspective view showing the relationship between a unit casing of an air conditioning unit for an automotive vehicle, according to a first embodiment of the invention, and electrical equipment.

The vehicle air conditioning unit is comprised of the unit casing 10, bracket portions 20, and fixing portions, referred to hereinafter.

The unit casing 10 is located at a central portion of the vehicle in the left-right direction of the same, and the bracket portions 20 are integrally formed with a rear portion of the unit casing 10 in the front-rear direction of the vehicle.

The bracket portions 20 support an audio unit (electrical equipment) 40. The audio unit 40 has a switch panel incorporating an operating section of the air conditioning unit.

The audio unit 40 has fixing plates 41 attached, respectively, to opposite side surfaces thereof. Each of the fixing plates 41 is formed with through holes 41a, 41b for securing the audio unit 40 to the bracket portions 20 by bolts 42.

The aforementioned fixing portions are constituted by upper end fixing plates 31, lower portion fixing plates 32, lower end fixing plates 33 and casing fixing plates 36, each of which will be described in detail hereinafter.

Figure 2:
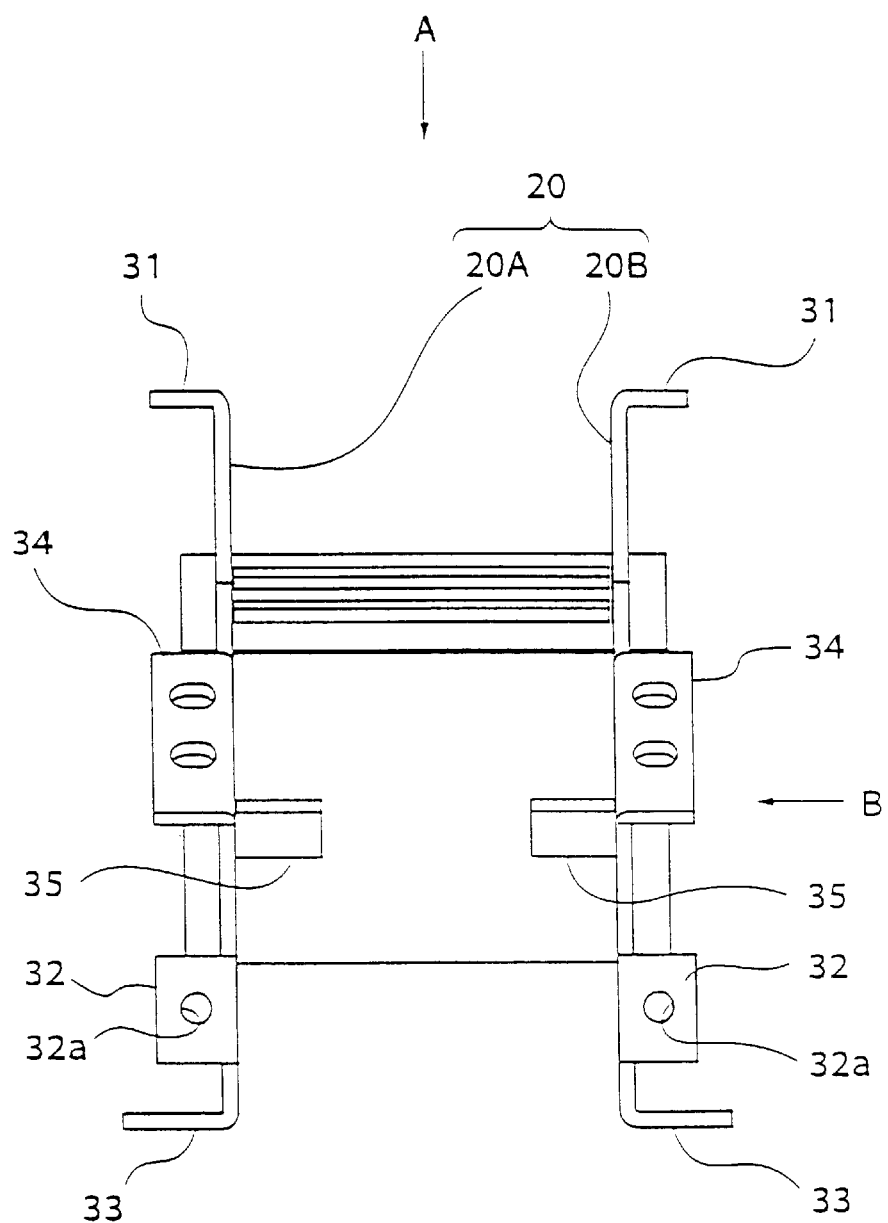
FIG. 2 is a front view of the air conditioning unit for an automotive vehicle.

FIG. 2 is a front view of the vehicle air conditioning unit.

The bracket portions 20 are constituted by a pair of plates 20A, 20B opposed and extending in parallel to each other.

Each bracket portion 20 has an upper end having the upper end fixing plate 31 integrally formed therewith. The upper end fixing plates 31 are formed by bending the upper ends of the plates 20A, 20B at a right angle. Each upper end fixing plate 31 is formed with through holes 31a, 31b (see FIG. 1) through which respective bolts or pins extend.

Each bracket portion 20 has a lower portion having the lower portion fixing plate 32 integrally formed therewith. The lower portion fixing plates 32 are formed by bending lower portions of the plates 20A, 20B at a right angle. Each lower portion fixing plate 32 is formed with a through hole 32a through which a bolt or a pin extends.

Each bracket portion 20 has a lower end having the lower end fixing plate 33 integrally formed therewith. The lower end fixing plates 33 are formed by bending the lower ends of the plates 20A, 20B at a right angle. Each lower end fixing plate 33 is formed with through holes 33a, 33b (see FIG. 1) through which respective bolts or pins extend.

Figure 3:
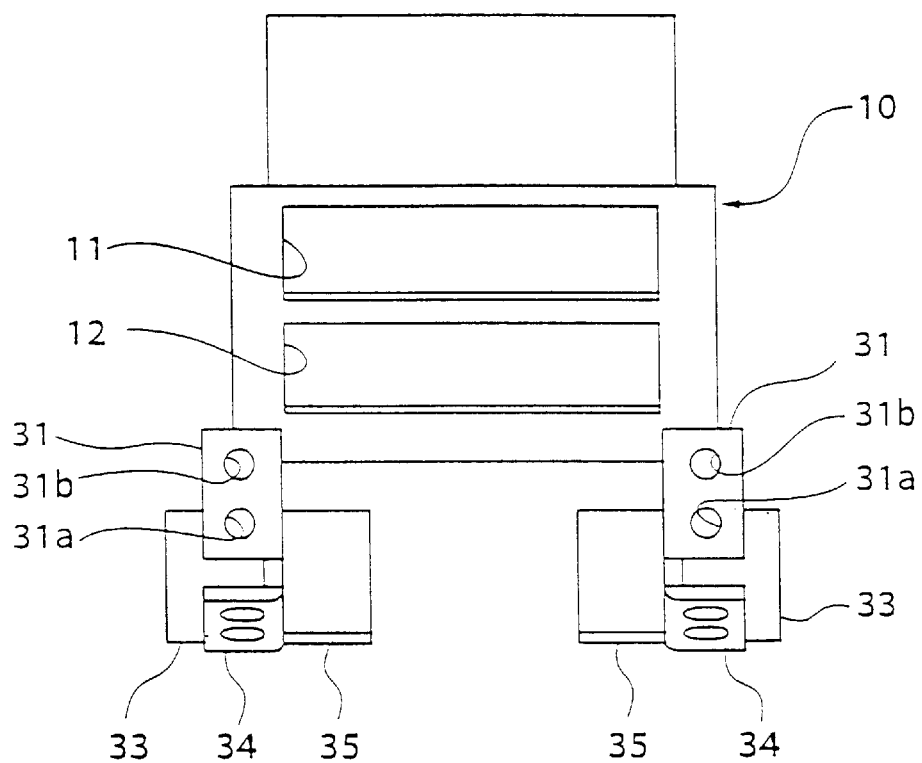
FIG. 3 is a view taken from an arrow A of FIG. 2.

FIG. 3 is a view taken from an arrow A of FIG. 2.

The unit casing 10 has an upper surface thereof formed with openings 11, 12 for blowing out air therethrough.

The bracket portions 20 have opposite guides 35 integrally formed therewith for guiding the audio unit 40 to a predetermined position. The guides 35 extend at a right angle to the respective plates 20A, 20B.

Figure 4:
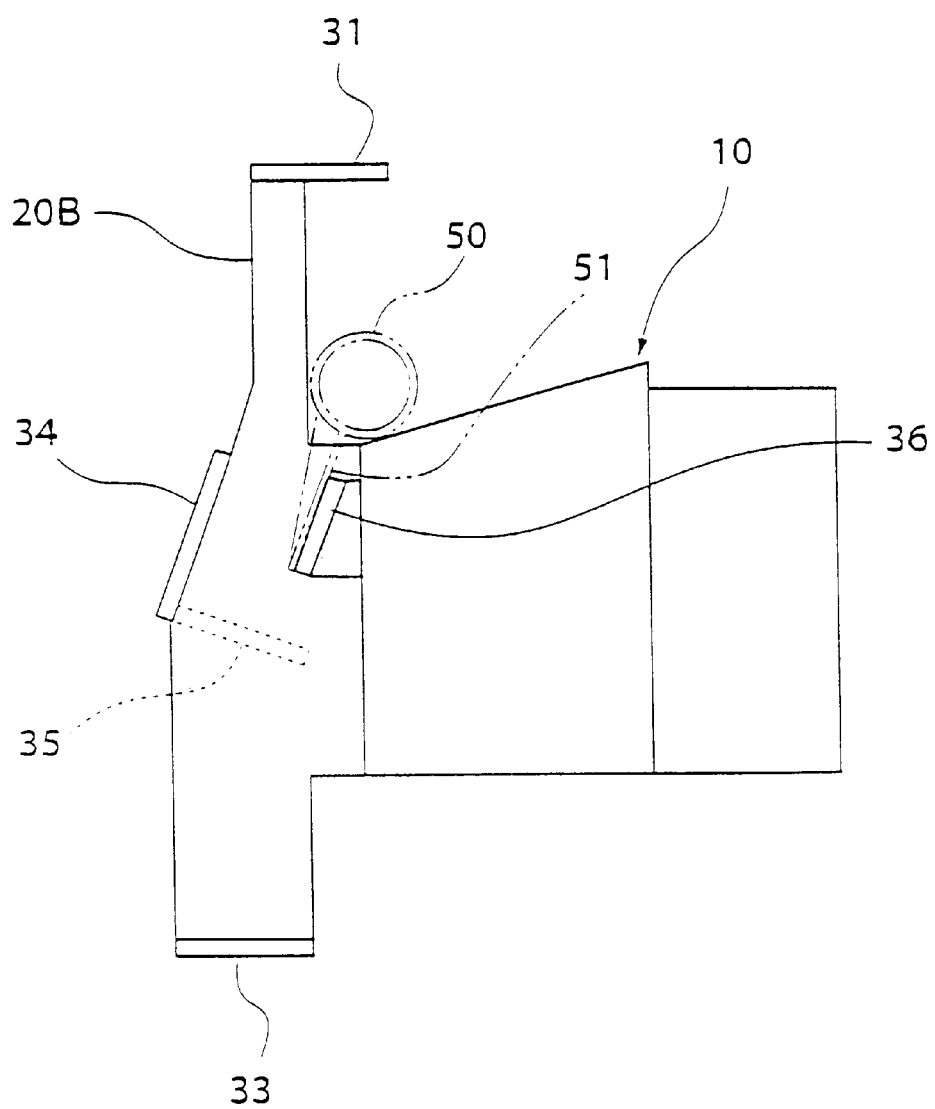
FIG. 4 is a view taken from an arrow B of FIG. 2.

FIG. 4 is a view taken from an arrow B of FIG. 2.

Each bracket portion 20 has an intermediate portion having an intermediate fixing plate 34 integrally formed therewith for fixing the audio unit 40.

The intermediate fixing plates 34 are formed by bending intermediate portions of the plates 20A, 20B at a right angle. Each intermediate fixing plate 34 is formed with through holes 34a, 34b through which the bolts 42 extend, respectively (see FIG. 1). The intermediate fixing plates 34 are formed in a manner inclined with respect to the vertical direction of the vehicle by a predetermined angle, and at a right angle to the respective guides 35.

The through holes 34a, 34b are each in the form of a slot (error-accommodating means) such that the position of the audio unit 40 with respect to an instrument panel, referred to hereinafter, can be adjusted during assembly of the audio unit 40 with the unit casing 10.

The unit casing 10 is integrally formed with the pair of casing fixing plates 36 (only one of them is shown in FIGS. 1 and 4). Each of the casing fixing plates 36 is formed with through holes 36a, 36b through which respective bolts or pins extend (see FIG. 1).

Figure 5:
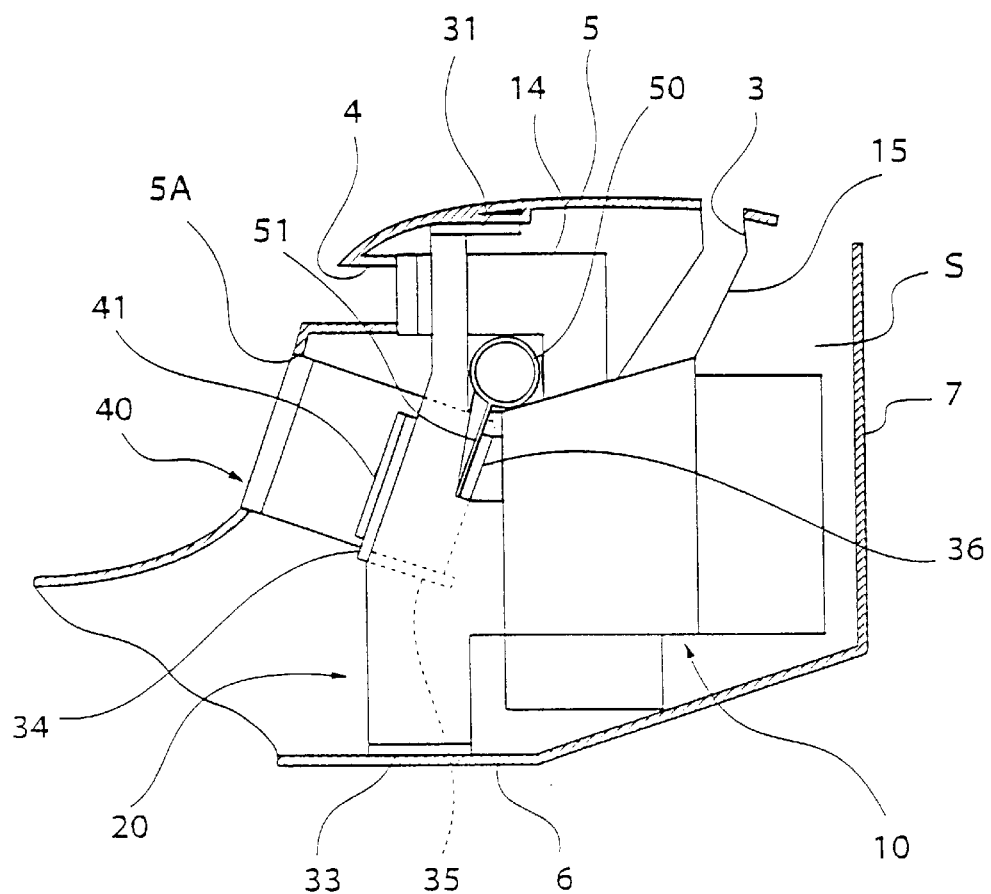
FIG. 5 is a cross-sectional view showing the air conditioning unit assembled with the vehicle.

FIG. 5 is a cross-sectional view of the vehicle air conditioning unit assembled with the vehicle.

The vehicle air conditioning unit is housed in a space S defined by the instrument panel 5, a floor panel 6, and a vehicle panel 7.

The openings 11, 12 (see FIG. 3) of the unit casing 10 communicate, respectively, with a vent outlet port 4 and a defroster air outlet port 3 formed in the instrument panel 5, via respective ducts 14, 15.

The instrument panel 5 is arranged within a compartment of the vehicle. The vehicle panel 7 separates an engine room and the compartment from each other, and the floor panel 6 is arranged on a floor of the compartment.

The upper end fixing plates 31 of the bracket portions 20 are fixed to the instrument panel 5 by bolts, not shown, while the lower end fixing plates 33 are fixed to the floor panel 6 by bolts, not shown.

Further, the lower portion fixing plates 32, not shown in FIG. 5, are also fixed to the instrument panel 5 by bolts.

There is arranged a hollow cylindrical steering member 50 in the vehicle in a manner extending in the left-right direction of the same. A bracket 51 is fixed to the steering member 50 e.g. by welding.

The casing fixing plates 36 are fixed to the bracket 51 of the steering member 50 by bolts, not shown.

When the bracket portions 20 are fixed to the instrument panel 5 and the floor panel 6 as described above, the relative position of the unit casing 10 with respect to the instrument panel 5 is determined.

As described above, the upper end fixing plates 31, the lower portion fixing plates 32, the lower end fixing plates 33 and the casing fixing plates 36 are fixed by the bolts to thereby function as fixing members.

It should be noted that bolts may be used only for fixing at least the casing fixing plates 36 to the bracket 51 such that the casing fixing plates 36 can serve as fixing members, and the other fixing plates 31, 32, 33 may be caused to function as engaging members by using pins.

To assemble the audio unit 40 with the unit casing 10, the audio unit 40 is placed on the guides 35 and pressed in, whereby the audio unit 40 is guided to a normal fixed position (predetermined position).

Then, the bolts 42 are inserted through the respective through holes 41a, 41b in the fixing plates 41 of the audio unit 40 and the respective corresponding through holes 34a, 34b in the intermediate fixing plates 34 of the bracket portions 20 to fix the audio unit 40 to the bracket portions 20.

According to the present embodiment, since each of the intermediate fixing plates 34 for assembling the audio unit 40 with the unit casing 10 is formed with the slots (through holes 34a, 34b), even if the unit casing 10 has been assembled with the instrument panel in a misaligned or improperly-positioned manner, the position of the audio unit 40 with respect to the instrument panel 5 can be corrected in the following process of assembling the audio unit 40 with the unit casing 10. More specifically, it is possible to align the center of the switch panel of the audio unit 40 with the center of an opening 5A of the instrument panel 5 to thereby provide a uniform clearance between the audio unit 40 and the opening 5A, which makes the air conditioning unit In the instrument panel excellent in appearance.

Further, since the unit casing 10 is not configured to also serve as a casing for the audio unit 40, it is easier for the air conditioning unit of the present embodiment to accommodate a difference in size between audio units 40 than the prior art disclosed in Japanese Laid-Open Patent Publication (Kokai) No. 10-6867, which enhances versatility of the air conditioning unit.

Moreover, it is possible to secure the unit casing 10 to the vehicle simply by fixing the casing fixing plates 36 to the steering member 50 by bolts and then engage the upper end fixing plates 31 and the lower end fixing plates 33 with the instrument panel 5 and the floor panel 6, respectively, so that the operation for fixing the unit casing 10 can be simplified, and hence the assembly man-hours can be reduced.

In addition, since the bracket portions 20 have the guides 35 integrally formed therewith, it is possible to easily mount even an audio unit 40 whose size is increased for its multifunction capability.

Figure 6:
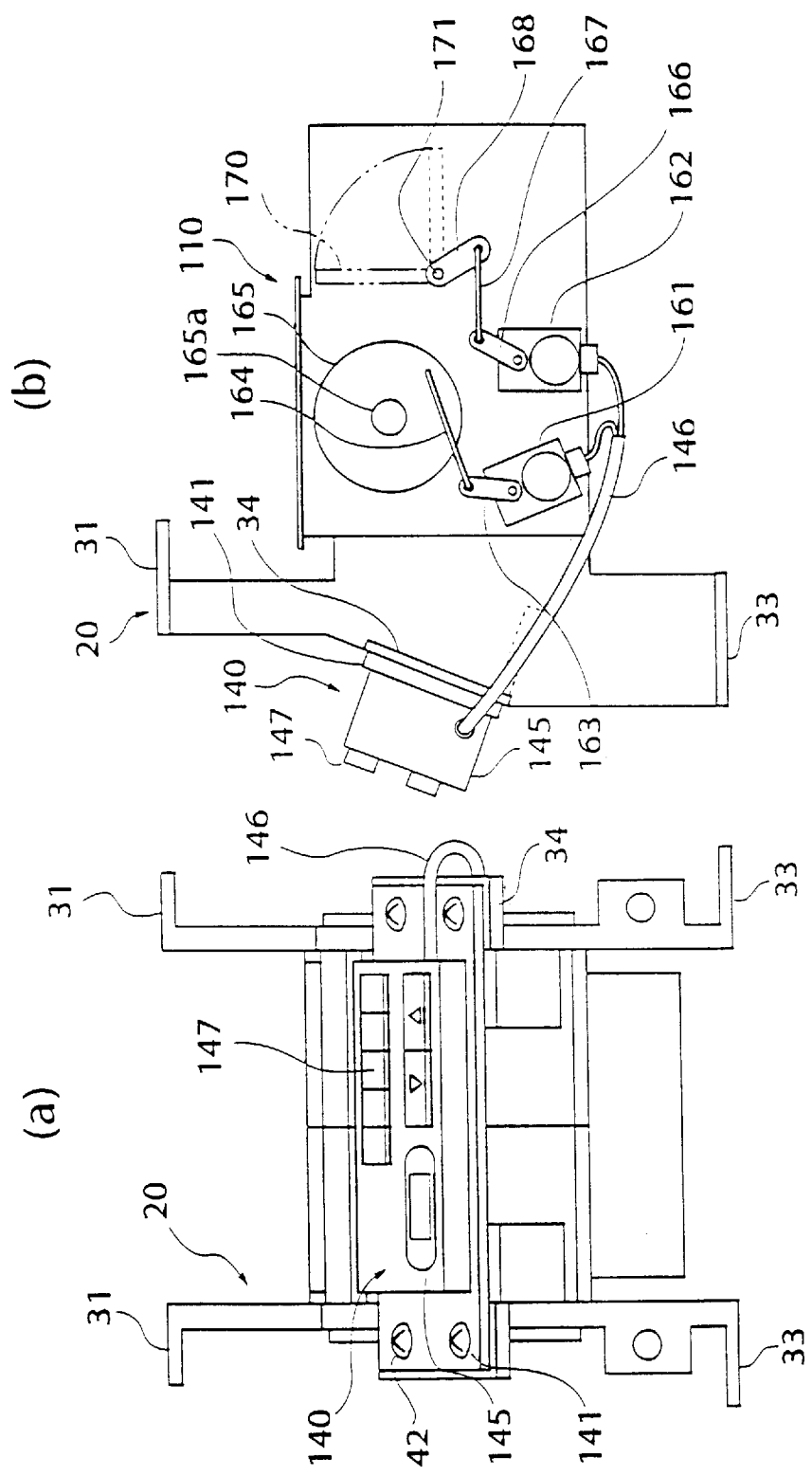
FIG. 6(a) is a front view showing an air conditioning unit for an automotive vehicle, according to a second embodiment, In a state being assembled with the vehicle.
FIG. 6(b) is a side view of the FIG. 6(a) air conditioning unit.

FIG. 6(a) is a front view of an air conditioning unit for an automotive vehicle, according to a second embodiment of the invention, while FIG. 6(b) is a side view of the same. Component parts and elements similar to those of the first embodiment are designated by identical reference numerals, and detailed description thereof is omitted.

The present embodiment is distinguished from the first embodiment in that an air conditioning amplifier (electrical equipment) 140 is integrally pre-assembled with the vehicle air conditioning unit.

The air conditioning amplifier 140 is comprised of an air conditioning amplifier body 145 and a cable 146.

The air conditioning amplifier body 145 is guided to a normal fixed position (predetermined position) along guides 35. The air conditioning amplifier body 145 has fixing plates 141 thereof fixed to intermediate fixing plates 34 of bracket portions 20 by bolts 42.

The cable 146 for air conditioning has one end thereof positioned on the compartment side of the air conditioning amplifier 140 with respect to one of the fixing plates 141. The cable 146 extends from the air conditioning amplifier 140 to a unit casing 110 by passing outside the bracket 20.

The cable 146 has the other ends thereof fixedly connected to actuators 161, 162 arranged on a side surface of the unit casing 110.

The actuator 161 has a door-driving lever 163 thereof connected to a cam lever 165 via a rod 164. The cam lever 165 rotates about a shaft 165a to drive a door, not shown, for opening and closing an air outlet port of the air conditioning amplifier 140. The actuator 161, the rod 164 and the cam lever 165 form door-driving means.

On the other hand, the actuator 162 has an air-mixing door-driving lever 166 thereof connected to one end of a door lever 168 via a rod.

The door lever 168 has the other end thereof fixedly connected to a pivot 171 of an air-mixing door 170 in a manner rotatable in unison with the air-mixing door 170.

Further, the air conditioning amplifier 140 is provided with buttons 147. When the buttons 147 are operated, the actuators 161, 162 are driven based on information stored in a controller, not shown, incorporated in the air conditioning amplifier 140.

In the present embodiment, the vehicle air conditioning unit is formed into a module such that it incorporates the air conditioning amplifier 140, so that it provides the following advantageous effects:

During assembly of the vehicle air conditioning unit with the vehicle, an operation for assembling the air conditioning amplifier 140 with the unit casing 110 can be dispensed with, which makes it possible to reduce time required for assembling the vehicle air conditioning unit with the vehicle, in comparison with the first embodiment.

Further, since it is not required to disassemble and reassemble the air conditioning amplifier body 145 separately, the quality of the product is improved.

Figure 7:
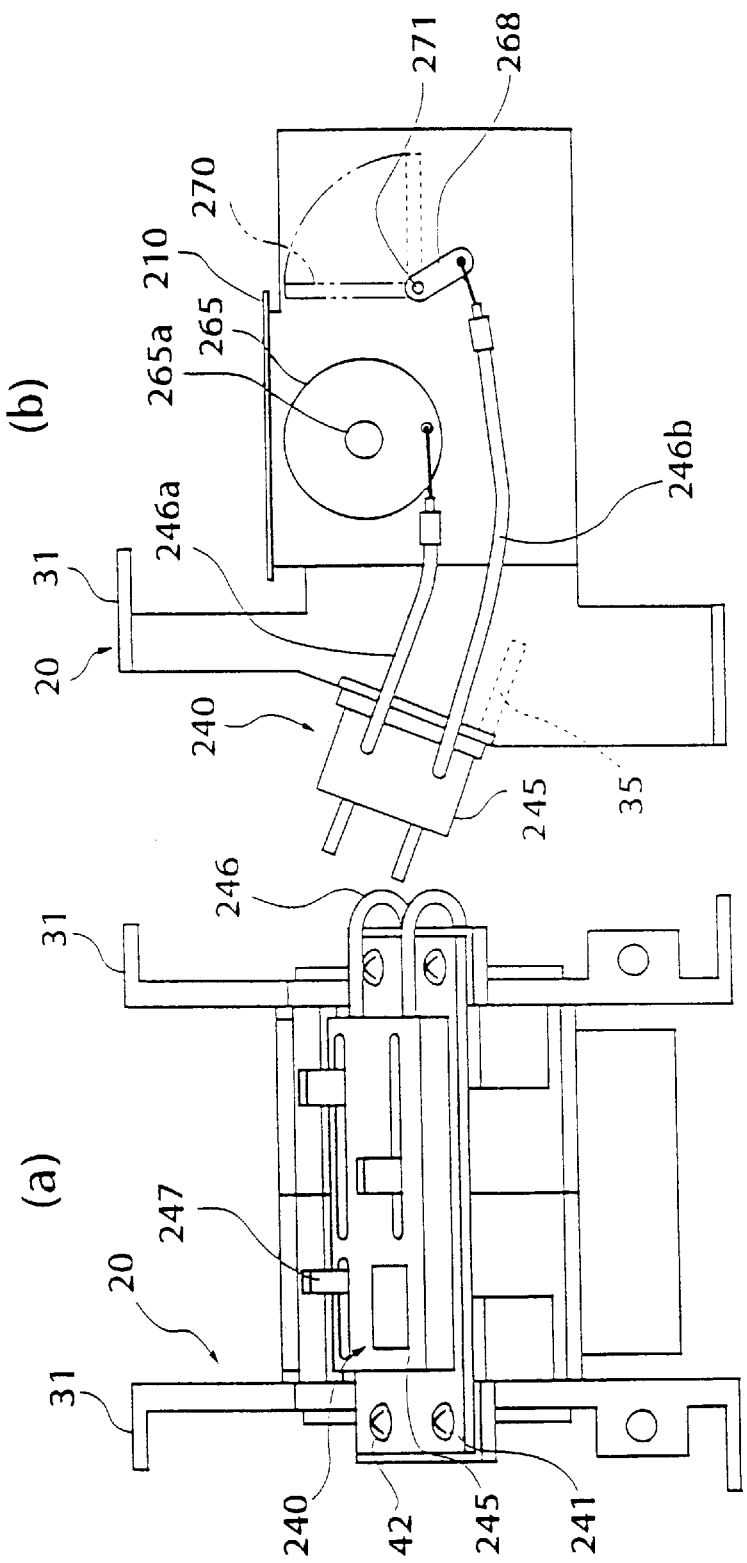
FIG. 7(a) is a front view showing an air conditioning unit for an automotive vehicle, according to a third embodiment, in a state being assembled with the vehicle.
FIG. 7(b) is a side view of the FIG. 7(a) air conditioning unit.
Figure 8:
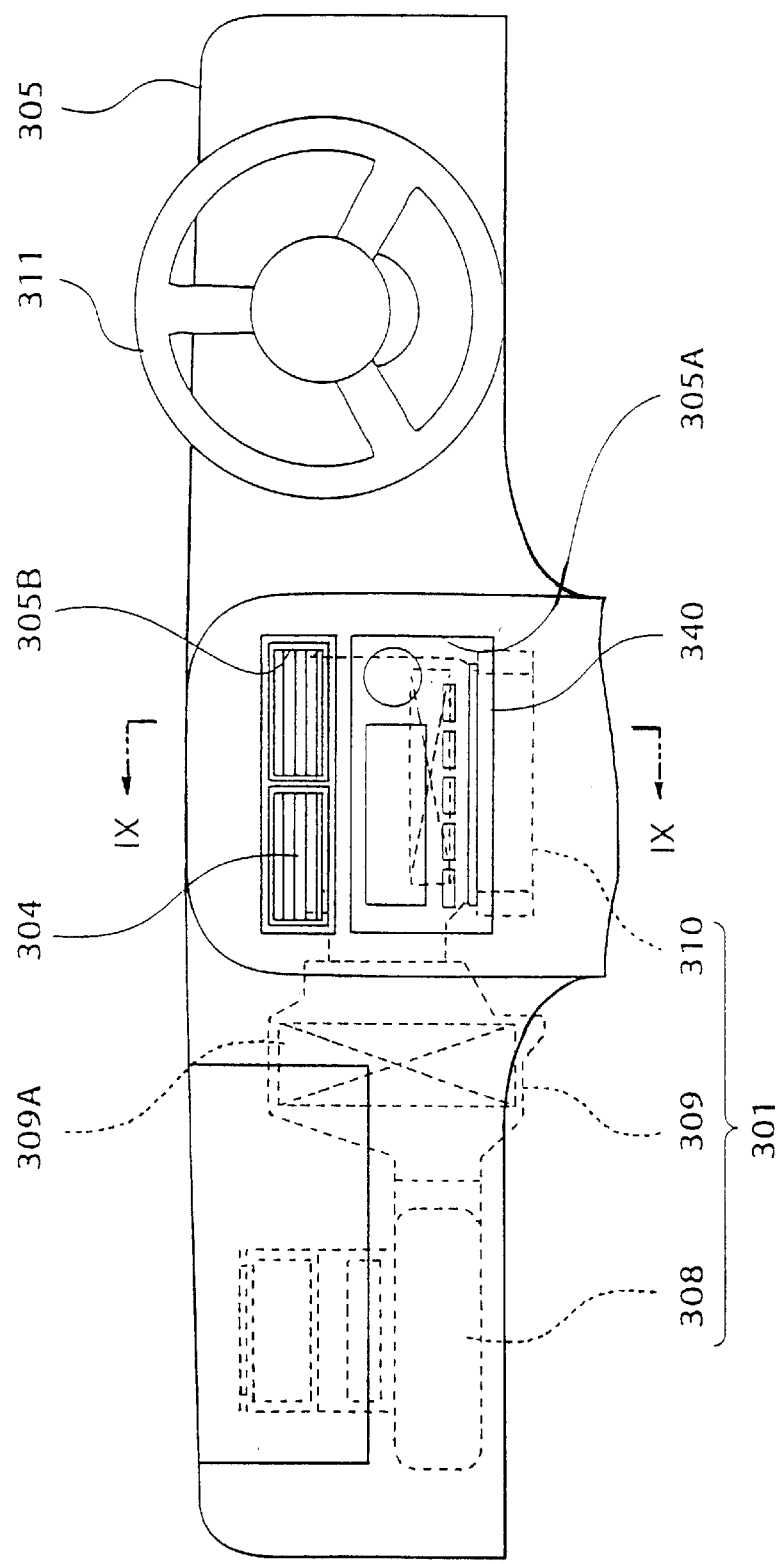
FIG. 8 is a front view of an instrument panel.
Figure 9:
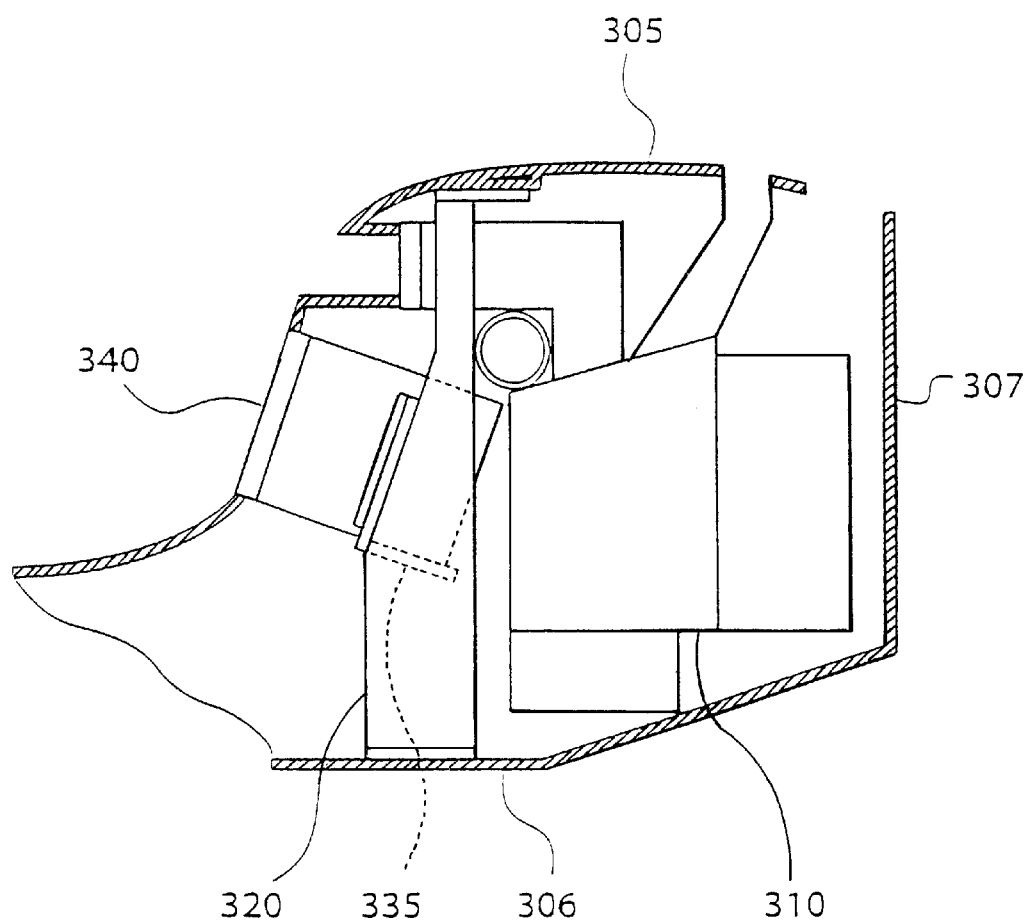
FIG. 9 is a cross-sectional view taken on line IX—IX of FIG. 8 as viewed from an arrow therein.

FIG. 7(a) is a front view of an air conditioning unit for an automotive vehicle, according to a third embodiment of the invention, while FIG. 7(b) is a side view of the same. Component parts and elements similar to those of the first embodiment are designated by identical reference numerals, and detailed description thereof is omitted.

The present embodiment is distinguished from the first embodiment in that a cable assembly (electrical equipment)

240 for manual operation is integrally pre-assembled with the vehicle air conditioning unit.

The cable assembly 240 is comprised of an assembly body 245 and cables 246a, 246b.

The assembly body 245 is guided to a normal fixed position (predetermined position) along guides 35. The cable assembly 240 has fixing plates 241 thereof fixed to bracket portions 20 by bolts 42.

The cables 246a, 246b for air conditioning each have one end thereof positioned on the compartment side of the cable assembly 240 with respect to one of the fixing plates 241. The cables 246a, 246b extend from the cable assembly 240 to a unit casing 210 by passing outside the bracket 20.

The cable 246a has the other end thereof connected to a cam lever (door-driving means) 265 arranged on a side surface of the unit casing 210. The cam lever 265 rotates about a shaft 265a to drive a door, not shown, for opening and closing an air outlet port of the unit casing 210.

The one end of the cable 246b for air conditioning is positioned on the compartment side of the cable assembly 240 with respect to the fixing plate 241. The cable 246b extends from the cable assembly 240 to the unit casing 210 by passing outside the bracket 20.

The cable 246b has the other end thereof fixedly connected to one end of a door lever 268 arranged on the side surface of the unit casing 210. The door lever 268 has the other end thereof fixedly connected to a pivot 271 of an air-mixing door 270 in a manner rotatable in unison with the air-mixing door 270.

The assembly body 245 is provided with levers 247 for operating the cables 246a, 246b to change the degrees of opening of the respective door and air-mixing door 270.

According to the present embodiment, it is possible to assemble the vehicle air conditioning unit with the vehicle in a shorter time than in the first embodiment as well as to manufacture the vehicle air conditioning unit at lower costs than in the second embodiment.

Although in the above embodiments, the through holes 34a, 34b of the intermediate fixing plates 34 are each in the form of a slot, the through holes 41a, 41b of the fixing plates 41 may be formed to be respective slots. Further, the through holes 34a, 34b, 41a, 41b may be formed to be respective slots such that the major axes of the through holes 34a, 34b are crosswise to those of the through holes 41a, 41b.

Further, although in the second embodiment, the degree of opening of the door and that of the air-mixing door 170 are controlled by the respective actuators 161, 162, this Is not limitative, but the degree of opening of at least one of an intake door, the door, and the air-mixing door may be controlled.

Moreover, although in the third embodiment, the degree of opening of the door and that of the air-mixing door 270 are manually controlled, this is not limitative, but the degree of opening of at least one of an intake door, the door, and the air-mixing door may be controlled.

INDUSTRIAL APPLICABILITY

According to the vehicle air conditioning unit of the present invention, even if electrical equipment is assembled with an instrument panel in a misaligned or improperly-positioned manner, it is possible to accommodate the misalignment or displacement by error-accommodating means, so that the electrical equipment can be assembled with the instrument panel with higher accuracy.

What is claimed is:

1. An air conditioning unit for an automotive vehicle, which is housed in a space defined by a vehicle panel separating an engine room and a vehicle compartment from each other, an instrument panel arranged in said vehicle compartment, and a floor panel arranged on a floor of said vehicle compartment, the air conditioning unit comprising:
a unit casing for being located in a central portion in a left-right direction of said vehicle;
a bracket portion integrally formed with a rear portion of said unit casing in a front-rear direction of said vehicle, for supporting electrical equipment;
a fixing portion for fixedly securing said unit casing to at least one of said instrument panel, a steering member, and said floor panel; and
error-accommodating means for accommodating an assembly error in assembling said electrical equipment and said instrument panel,
wherein said fixing portion comprises a fixing member for fixedly securing said unit casing to any of said instrument panel, said steering member, and said floor panel, and an engaging member for engaging said unit casing with any of said instrument panel, said steering member, and said floor panel, and
wherein said electrical equipment is integrally assembled with said unit casing.

2. An air conditioning unit for an automotive vehicle, according to claim 1, wherein said electrical equipment includes a cable for air conditioning, one end of said cable being positioned on a compartment side of said electrical equipment with respect to a fixing plate of said electrical equipment, another end of said cable which extends from said electrical equipment to said unit casing by passing outside said bracket portion, being fixedly connected to door-driving means; for driving a door arranged in said unit casing.

* * * * *